US011212520B2

(12) United States Patent
Abdelkhalek et al.

(10) Patent No.: US 11,212,520 B2
(45) Date of Patent: Dec. 28, 2021

(54) REGION-BASED REFERENCE FRAME MANAGEMENT

(71) Applicant: ATI Technologies ULC, Markham (CA)

(72) Inventors: Ahmed M. Abdelkhalek, Markham (CA); Ihab M. A. Amer, Markham (CA); Khaled Mammou, Vancouver (CA)

(73) Assignee: ATI TECHNOLOGIES ULC, Ontario (CA)

( * ) Notice: Subject to any disclaimer, the term of this patent is extended or adjusted under 35 U.S.C. 154(b) by 217 days.

(21) Appl. No.: 16/209,308

(22) Filed: Dec. 4, 2018

(65) Prior Publication Data

US 2020/0177876 A1 Jun. 4, 2020

(51) Int. Cl.
*H04N 19/105* (2014.01)
*H04N 19/172* (2014.01)
*H04N 19/14* (2014.01)
*H04N 19/119* (2014.01)

(52) U.S. Cl.
CPC ......... *H04N 19/105* (2014.11); *H04N 19/119* (2014.11); *H04N 19/14* (2014.11); *H04N 19/172* (2014.11)

(58) Field of Classification Search
CPC .............................. H04N 19/105; H04N 19/17
See application file for complete search history.

(56) References Cited

U.S. PATENT DOCUMENTS

| 10,616,576 | B2* | 4/2020 | Ameres | H04N 19/523 |
| 2015/0117515 | A1* | 4/2015 | Fu | H04N 19/136 |
| | | | | 375/240.02 |
| 2018/0109792 | A1* | 4/2018 | Song | H04N 19/119 |

OTHER PUBLICATIONS

Amer, I. et al., "Low Power/Low Latency Video Compression for Cloud-Assisted Gaming", Tutorial delivered at IEEE International Conference on Circuits and Systems (ISCAS), Montreal, Canada, May 2016.
Amer, I. et al., "Video Compression for Cloud Gaming: Power and Latency Aspects", submitted to IEEE Transactions on Circuits and Systems for Video Technology (TCSVT), Aug. 2017.

* cited by examiner

*Primary Examiner* — Jerry T Jean Baptiste
(74) *Attorney, Agent, or Firm* — Volpe Koenig

(57) ABSTRACT

Disclosed herein is a region-based reference management system using in video frame encoding. Source content, such as video game streaming or remote desktop sharing, that includes scene changes or significant instantaneous changes in a region from one frame to the next can present encoding challenges. Techniques disclosed herein use hints about changes in regional frame content, dissect frame content into regions, and associate the dissected regions with stored reference frame data using the hints and information about the regions to more efficiently encode frames.

21 Claims, 12 Drawing Sheets

REGION-BASED REFERENCE FRAME MANAGEMENT

BACKGROUND

A popular use-case for video encoding involves a user playing a video game while the screen content is being encoded and streamed to other users watching in real-time. Another popular use-case for video encoding is screen-sharing wherein a user's screen is encoded and streamed to other viewers. Yet another popular use case for video encoding is remote/virtual desktop environments where computer-generated images are rendered in the cloud and the content is encoded and streamed to a remote user.

A common occurrence for all of the above scenarios is the instantaneous change of the source content. For example, in the video game streaming scenario, a frame instantaneously shows an "inventory list" for a game character, or the frame instantaneously shows a top-view of the "game world".

Instantaneous changes from one frame to the next frame result in large differences between successive frames being encoded. A conventional encoder encodes a current frame using the previous frame as a reference and the difference between the current frame and the reference frame. Thus, the conventional encoder needs to encode a large difference when these instantaneous changes occur, which results in poor compression performance due to the low inter-frame correlation. The low inter-frame correlation encountered by a conventional encoder results in compression challenges such as poor quality, high latency, and/or bandwidth challenges when encoding in real-time.

FIG. 3 is a diagram depicting an example scenario of a series of frames including instantaneous changes that are encoded by a conventional encoder. When it is described herein that a frame is being used as a reference frame, it should be understood that the frame is a reconstructed version of the received input frame. Typically, during encoding, a reconstructed version of a frame is a lossily-encoded version of the frame. A frame used as a reference frame is a reconstructed version of the frame so that the reference data used in the encoding process mimics the decoding process. Thus, when referring to a frame being used as a reference frame, the terms frame, reference frame, and a reconstructed version of a frame can be used interchangeably. As described above, a conventional encoder uses a reconstructed version of an immediately prior frame as the reference frame for frame 310. Then, the conventional encoder uses frame 310 as the reference frame for frame 320. In frame 320, an instantaneous change occurs in region 301. This instantaneous change, for example, could be due to an inventory window being opened in a video game. This results in compression efficiency challenges since reference frame 310 is very different in this region.

Then the conventional encoder continues to encode frames including frames 330 and 340, again, using immediately prior frames as respective reference frames. In this example, because frames 330 and 340 include the same information in region 301 as in frame 320, the conventional encoder using the immediately prior frame as a reference does not present a compression challenge.

When the conventional encoder attempts to encode frame 350, the region 301 has reverted to a similar state to that of frame 310. This instantaneous change, for example, could be due to the inventory window being closed in the video game. Because the conventional encoder uses immediately prior frame 340 as the reference when encoding frame 350, there is a low correlation between reference frame 340 and frame 350, which again results in a compression challenge.

The conventional encoder continues to encode frames including frame 360 using immediately prior frames as respective reference frames. Here, the conventional encoder is not presented with compression challenges due to the high inter-frame correlation until the encoder reaches frame 370. Once again, the instantaneous change in region 301 from frame 360 to frame 370 results in a compression challenge.

In real-time use cases such as video game streaming or remote desktop display, low latency is a critical performance factor. Transmitting an encoded video bit stream corresponding to the input content must take less than some pre-defined time budget, e.g. 10 ms, otherwise a corresponding frame rate is not supportable. Likewise, an associated bandwidth constrains the maximum encoded frame size. When a conventional encoder encounters an instantaneous change, the conventional encoder is constrained from using enough bits to guarantee high-quality encoding. As such, encoding quality suffers due to the low-correlation of the reference frame to the current frame. This results in the current frame being encoded with poor quality. The poorly encoded frame is then used as a low-quality reference frame for the next frame, which results in a cascading problem.

In non-real-time use cases such as video game recording or transcoding, low latency is not a requirement. Therefore, the encoder can spend more time encoding frames and can allow for high bit rate fluctuations to ensure an optimal encoding quality. In the non-real-time scenario, average bitrate/bandwidth constraints must be met. Therefore, the main objective for the encoder in the non-real-time scenario is to provide the best possible encoded quality under an average bitrate/bandwidth constraint. A conventional encoder requires more bits to encode an instantaneous change in a current frame when a sub-optimal reference frame is selected. The inflated expenditure of bits on these instantaneous changes reduces the overall remaining available bits, which results in an overall poorer quality.

Although there is a high correlation between frame 350 and frame 310 in FIG. 3, the conventional encoder fails to take advantage of this high correlation. Likewise, the conventional encoder fails to take advantage of the high correlation between frame 370 and frame 340. Thus, a need exists for managing reference frame data when encoding video with instantaneous changes that identifies and uses frames and regions of frames that serve as better references for currently encoded frames.

BRIEF DESCRIPTION OF THE DRAWINGS

A more detailed understanding can be had from the following description, given by way of example in conjunction with the accompanying drawings wherein.

DETAILED DESCRIPTION

Figure 1:
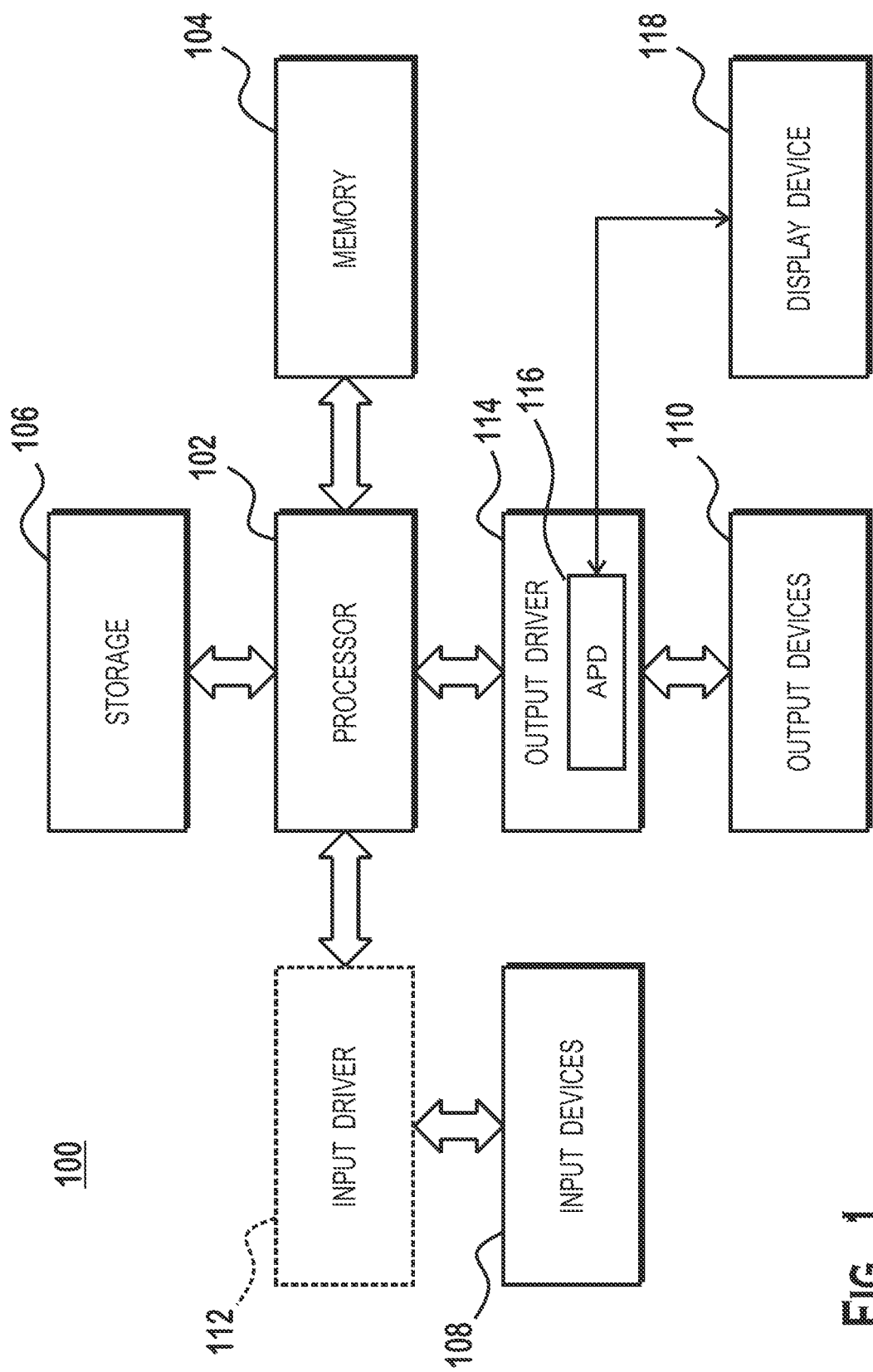
FIG. 1 is a block diagram of an example device in which one or more features of the disclosure can be implemented.

The present disclosure is directed to region-based techniques for managing reference frame information used in video frame encoding. Source content that includes scene changes or significant instantaneous changes in a region from one frame to the next can present encoding challenges. Example use cases that exhibit these challenging situations include streaming video games or remotely sharing a desktop environment wherein user interaction within the source content causes windows and menus to be opened and closed that result in a large regional change in screen data. Techniques disclosed herein use hints about changes in regional frame content, dissect frame content into regions, and associate the dissected regions with stored reference frame data using the hints and information about the regions to more efficiently encode frames.

Disclosed herein are an example systems and methods for region-based reference frame management. For example, the methods include receiving a first frame and a first indication associated with the first frame and for storing a reconstructed version of the first frame and the first indication. The methods further include receiving a second frame, wherein the second frame is received after the first frame. The methods further include receiving a third frame and another indication associated with the third frame, wherein the third frame is received after the second frame. The methods further include encoding a portion of the third frame using the first frame as a first reference frame based on the first indication and the another indication. The methods also include encoding at least some of a remaining portion of the third frame using the second frame as a second reference frame.

In another example, in some methods, the encoding further includes encoding the portion of the third frame using a corresponding portion of the first frame.

In yet another example, some methods further include analyzing the first frame and identifying the corresponding portion.

In yet another example, some methods further include matching the another indication with the first indication.

In yet another example, in some methods, the first indication identifies a window in the first frame and the another indication identifies the window in the third frame.

In yet another example, some methods further include dividing the first frame into multiple regions and dividing the third frame into multiple regions.

In yet another example, in some methods, the dividing the first frame and the dividing the third frame is based on an analysis of a content of each frame.

In yet another example, some methods further include encoding the first frame, encoding the second frame, and streaming the encoded first frame, the encoded second frame, and the encoded third frame.

In yet another example, some methods further include tracking a cost of encoding the third frame using the first indication and the another indication and adjusting a choice of a future reference frame based the tracking.

In yet another example, some methods further include analyzing the first frame and the third frame based on the first indication and the another indication, identifying a region in both the first frame and the third frame that contains content that is substantially similar, and updating location information associated with the region and storing the location information along with the third frame.

The above example methods can be implemented in a system that can be implemented as executable code in a non-transitory computer readable storage medium for execution by one or more processors.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 can be located on the same die as the processor 102, or can be located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

The example device 100 depicted in FIG. 1 is configured to perform region-based reference management in accordance with the disclosed examples herein. The example device 100 receives frames of an input video via input devices 108, such as an Internet connection, encodes the frames using processor 102 and/or APD 116, and produces the encoded frames as an encoded output video that can be displayed on display device 118, or stored in storage 106, or output to output devices 110, such as an Internet connection.

Figure 2:
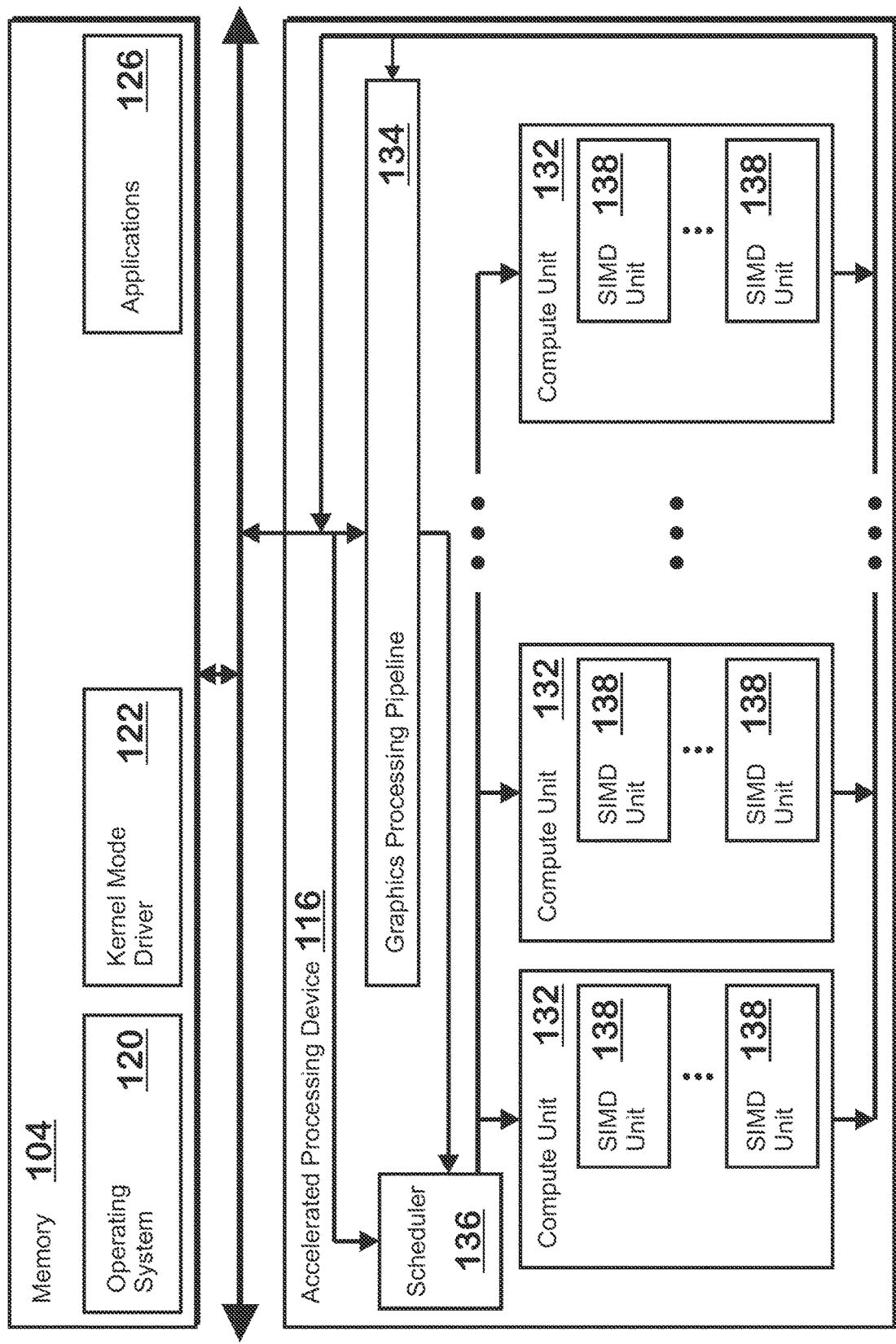
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The device 100 depicted in FIG. 1 and FIG. 2 can be used to implement the region-based reference frame management techniques disclosed herein.

Figure 3:
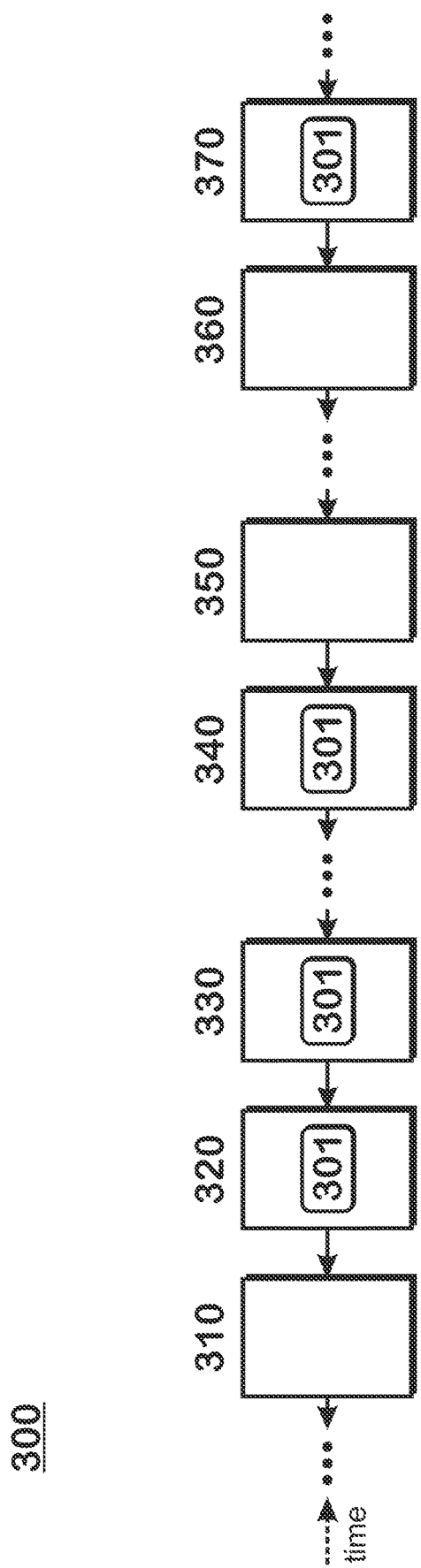
FIG. 3 is a diagram depicting a series of frames and an indication of their respective reference frames used in an encoding process by a conventional video encoder.
Figure 4:
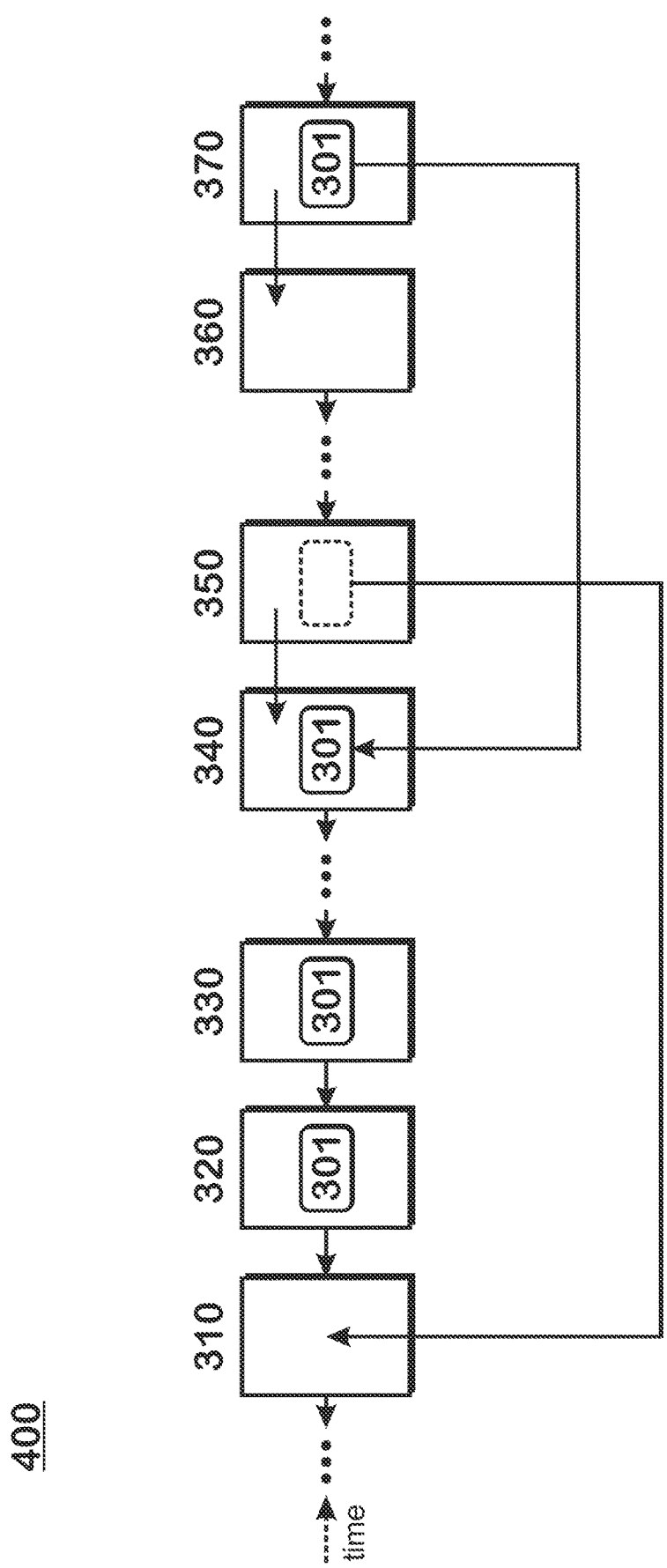
FIG. 4 is a diagram depicting a series of frames and an indication of their respective reference frames used in an encoding process by a video encoder employing reference management techniques disclosed herein.

FIG. 4 is a diagram depicting an example series of frames that include regional changes that are encoded using region-based reference frame management. An instantaneous change or regional change is also known as a scene change. The terms instantaneous change, regional change, or scene change can be used interchangeably and correspond to a significant change in a portion of a frame or an entire frame with respect to the immediately prior frame. Frame 310 is received and stored as a reference frame. On a condition that the frame immediately preceding frame 310 is lowly correlated to frame 310, frame 310 can be stored as a new reference frame. If frame 310 is highly correlated to its preceding frame, then frame 310 can replace its preceding frame as a reference frame. In FIG. 4, a regional change in region 301 is depicted in frame 320 with respect to immediately prior frame 310. This is the first time regional change in region 301 is encountered, so there are no references available that closely match the new content in region 301. So, a compression-efficiency challenge is experienced when encoding the new content in region 301 of frame 320 due to the lack of a reference frame with high correlation to this portion. However, the rest of frame 320 outside of region 301 closely matches the corresponding portions of frame 310. Therefore, frame 320 references frame 310 for these regions, which results in high compression efficiency due to the inter-frame correlation in these regions. As set forth above with respect to FIG. 3, when it is described herein that a frame is being used as a reference frame, it should be understood that the frame is a reconstructed version of the received input frame. A reconstructed version of a frame is a lossily-encoded version of the frame. A frame used as a reference frame is a reconstructed version of the frame so that the reference data used in the encoding process mimics the decoding process. Thus, when referring to a frame being used as a reference frame, the terms frame, reference frame, and a reconstructed version of a frame can be used interchangeably.

Once frame 320 is encoded, frame 320 with the regional change in region 301 is stored as a reference frame in addition to previously stored frame 310. Alternatively, frame information corresponding to only the regional change in region 301 can be stored instead of all of frame 320. Alternatively, all of frame 320 can be stored and only the portion of frame 310 that corresponds to the regional change in region 301 can be stored. In this way, less frame information is needed to be stored and the latest reference to the unchanged regions outside of region 301 are stored through the storage of frame 320, while this less recently used corresponding information from frame 310 can be discarded. In an example, a received frame or a portion of a received frame can be stored in one portion of storage and can be region-matched with a reconstructed frame or portion of a reconstructed frame that is stored in another portion of storage as used as reference frame data.

When frame 330 is encountered, it is determined that the content corresponding to the regional change in region 301 is also present in frame 330 as it is in frame 320. Thus, there is no encoding challenge and frame 330 can reference frame 320. Also, frame 330 replaces frame 320 in storage for future reference because it includes a more recent version of the content in region 301. Similarly, the process continues through frame 340, where frame 340 references the frame immediately prior to it and frame 340 replaces the immediately prior frame in storage for future reference frame 310 is still maintained in storage for future reference. In an example, frame 310 can be maintained as a "long-term" reference frame, for example, as allowed by H.264/High Efficiency Video Coding (HEVC) codecs.

When frame 350 is encountered, the regional change in region 301 is reverted (depicted by the dashed box). As depicted in FIG. 4, the portion of frame 350 that reverted the regional change refers back to the last stored reference before the regional change, i.e. frame 310. The remainder of frame 350 outside of the region 301 refers back to the corresponding regions of frame 340. As can be seen, different portions of frame 350 now point to different references, which improves coding efficiency. Because frame 350 reverted the regional change in region 301, frame 350 can replace frame 310 in storage. Similarly, assuming no changes between frame 350 to frame 360, frame 360 replaces the previous frames that replaced frame 350 in storage.

It should be noted that frame 340 is still being kept in storage as a long-term reference. When frame 370 is encountered, a regional change in region 301 is detected and is determined to closely match the corresponding region in frame 340 from storage. So, region 301 in frame 370 references the corresponding region in frame 340 and the remainder of frame 370 references the corresponding remaining portions of frame 360 in storage frame 370 now replaces frame 340 in storage for future reference. Alternatively, as similarly described above with respect to frames 310 and 320, in another example, only portions of frames 360 and 370 can be stored.

The compression efficiency experienced by the region-based reference frame management represented by the diagram of FIG. 4 is greatly improved over that represented by FIG. 3. In FIG. 3, compression efficiency challenges were experienced at least for frames 320, 350, and 370. In FIG. 4, the compression efficiency challenges were overcome for frames 350 and 370, resulting in greater compression efficiency and improved performance.

Although FIG. 4 depicts a change in only a single region 301, an encoder using region-based reference frame management is capable of detecting multiple region changes in any given frame and can map each of the multiple different regions to a respective region across multiple different reference frames. For example, for a given frame, 10 different regions may be detected and each of the 10 different regions can be mapped to 10 different reference regions. These 10 different reference regions may be contained with 10 different reference frames or may be contained within fewer reference frames wherein a single reference frame may contain a plurality of the reference regions. Thus, even for frames with multiple region changes, much higher compression efficiency can be achieved.

Additionally, although FIG. 4 depicts region 301 in the same portion of respective frames 320, 330, 340, and 370, the region-based reference management system can handle the region 301 moving from frame to another frame. In this way, for example, the region-based reference management system can efficiently encode a frame that includes a window that re-appears in a different location than it had originally appeared in an earlier frame.

Furthermore, the description of FIG. 4 included storing each frame or a portion of each frame as a reference frame at some point in the encoding process. However, this should not be limiting. It is not required to store all frames or portion of a frame as a reference frame. Thus, some received frames will not replace an existing reference frame nor will be added as a reference frame.

Figure 5:
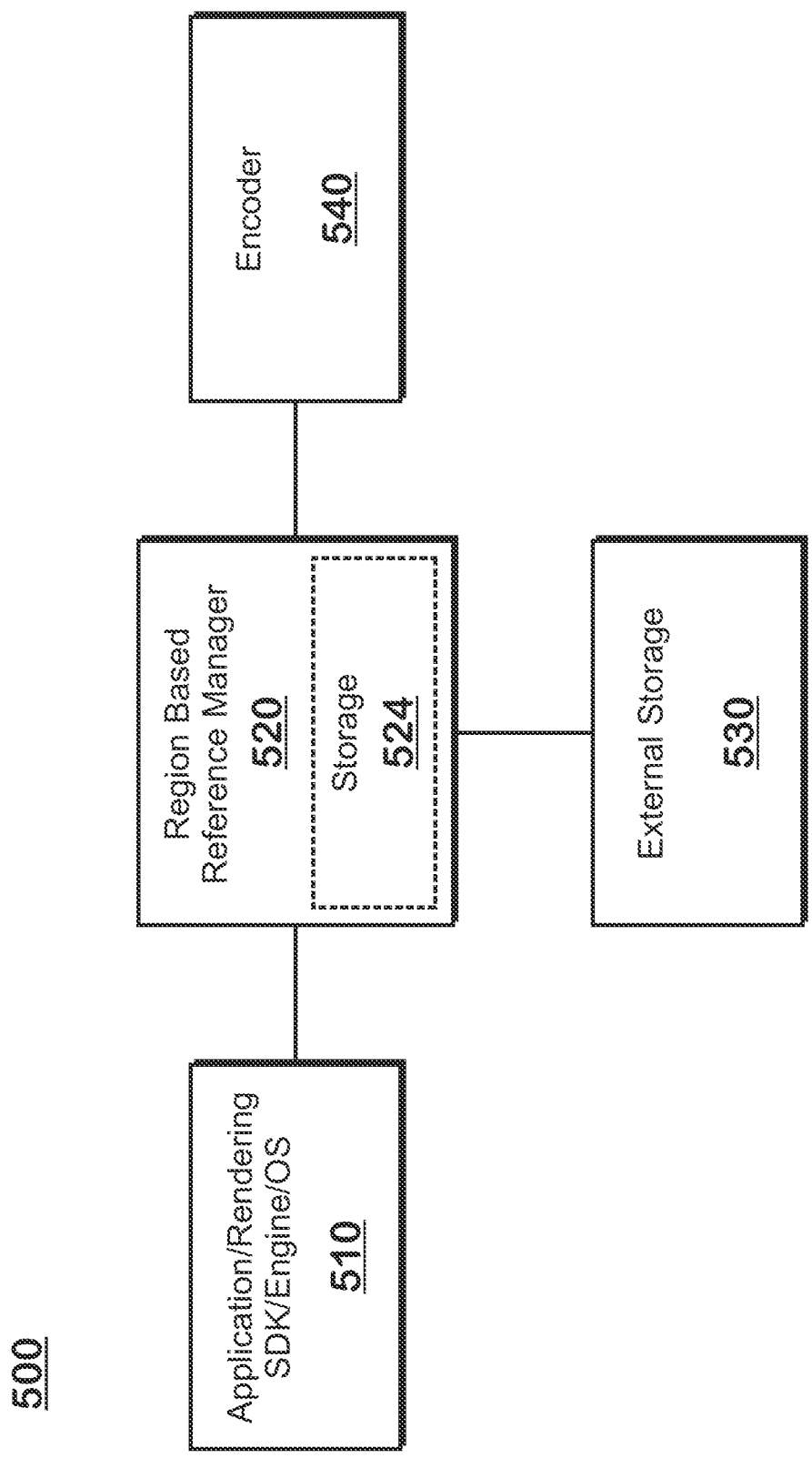
FIG. 5 is a diagram of an example region-based reference frame management system.

FIG. 5 is a block diagram depicting an example region-based reference management system 500. A region-based reference manager 520 is operationally coupled to an application, rendering software development kit (SDK), engine, or operating system (OS) 510. The region-based reference manager 520 is also operationally coupled to an external storage 530 and to an encoder 540. The region-based reference manager also includes a storage 524. The example region-based reference management system 500 is configured to perform techniques for identifying and using optimal reference frames during encoding of content that contains instantaneous region changes.

Figure 6:
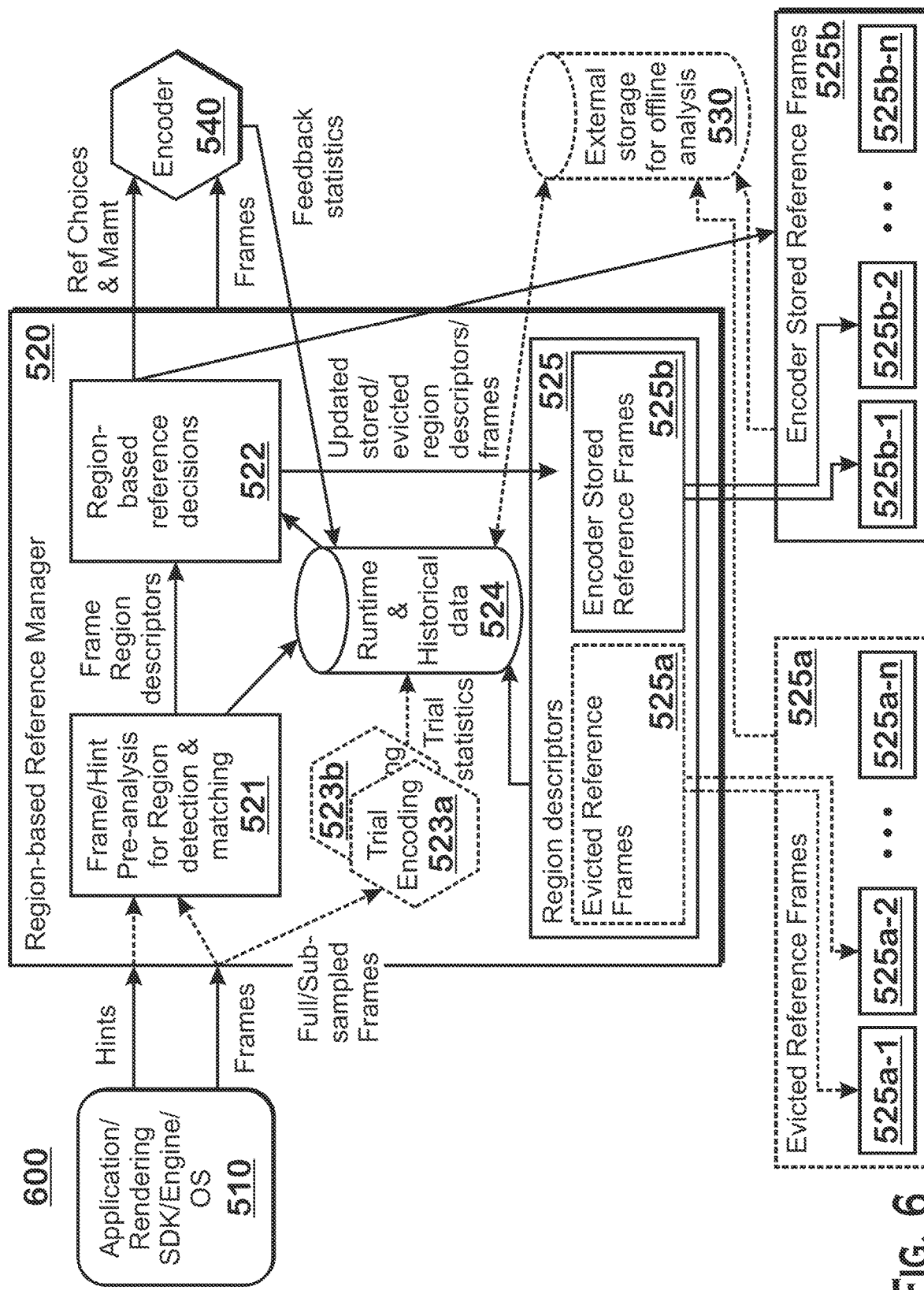
FIG. 6 is a diagram of another example region-based reference frame management system.

FIG. 6 is a block diagram depicting a more detailed example region-based reference management system 600. The region-based reference manager 520 receives frames as well as hints, which may also be referred to more generally as indications, from the Application, Rendering SDK, engine, or OS 510 that can be used by the region-based reference manager 520 to deduce information about the frames. A frame ready for display can be prepared by a rendering engine. The hints can directly identify existing references associated with same hints or can indirectly guide the region-based reference manager 520 to identify optimal reference candidates. In an example, the region-based reference manager 520 can include a block 521 that receives hints and frames and performs frame and hint pre-analysis for region detection and region matching. The region-based reference manager 520 can also receive time and/or bitrate constraints, if any, for encoding each frame. The region-based reference manager 520 can adjust its runtime behavior to meet the constraints.

An example of a hint that directly identifies existing references is a label or identifier for a current frame or an individual region of the frame. For example, "game world map top-view" is a direct hint. Another example of a direct hint is coordinates of regions that make up a frame. For example, a frame can be divided into four quadrants, and each quadrant can be associated with a respective identifier. In an example, the region-based reference manager 520 can also include a block 522 that performs region-based reference decisions. The region-based reference decisions block 522 uses frame and region descriptions, such as the example direct hints described above, to decide which frame or region of a frame to use when encoding a current frame. The region-based reference manager 520 can choose a more optimal reference with higher confidence using such explicit labels or identifiers.

An example of a hint that indirectly guides the region-based reference manager 520 to identify an optimal reference candidate includes an OS notification of a window appearing in a certain region of a screen. This OS notification can be associated with the current frame. In an example, the frame and hint pre-analysis for region detection and matching block 521 can use techniques to infer optimal reference candidates based on indirect hints. For example, when the region-based reference manager 520 detects a second OS notification with the same window information, the frame and hint pre-analysis for region detection and matching block 521 can find the previous frame that was associated with the same OS notification. Because the previous frame is associated with the same OS notification, it has a higher potential of being a higher-correlated reference for the current frame.

The region-based reference manager 520 can also include block 523*a* and 523*b* that perform trial encoding of frames. Although block 523*a* and 523*b* are depicted, more or fewer blocks can be included to perform trial encoding. Region-based reference manager 520 also includes storage 524 that stores trial statistics from the trial encoding.

The region-based reference manager 520 outputs, to the encoder 540, frame data and commands such as encoder reference management commands and current frame reference commands. Encoder reference management commands inform the encoder which frames should be added and/or removed from the encoder's decoded picture buffer (DPB), which stores encoder reference frames 525*b* used for motion prediction. Thus, encoder stored reference frames 525*b* may also be referred to as the DPB. The evicted reference frames are stored in evicted reference frame information 525*a*. Encoder reference management commands can include long-term management support in encoding standards such as H.264 and HEVC. Current frame reference commands identify the references in the DPB that should be used for motion prediction when encoding a current frame or its regions. The region-based reference manager 520 receives feedback from the encoder associated with encoding costs and statistics. This feedback is stored in storage 524. For example, feedback from the encoder can include the number of bits spent encoding a frame or the number of bits spent encoding a region of a frame. This feedback aids the region-based reference manager 520 in evaluating the impact of its reference decisions and adjusting future decisions based on the evaluation.

The region-based reference manager 520 includes storage 524 to store, for example, runtime data, historical data, trial encoding statistics, encoder feedback statistics, and region descriptors including evicted reference frame information 525*a* and encoder stored reference frames 525*b*. The region-based reference manager also retrieves and can store historical statistics from external storage 530. Statistics from a previous encoding session are stored in the external storage 530. These statistics can relate to any aspect of operation of the region-based reference management system 600, including, for example, notifications received, outputs generated, effect of a decision, etc. The region-based reference manager 520 analyzes statistics from one or more past sessions retrieved from external storage 530 to improve decision making for current and future sessions.

Although the region-based reference management system 600 is depicted with a particular arrangement of discrete components, these components can be combined or otherwise merged, separated, or eliminated entirely. Furthermore, associated functionality of the components can be moved into other components. Thus, a region-based reference management system is envisioned as encompassing any combination of the functionality described herein. Furthermore, information can be passed between any of the components depicted in FIG. 6 without an explicit signal path being depicted.

The region-based reference manager 520 is configured to perform a plurality of tasks associated with deciding on optimal regional references to improve encoding efficiency. FIGS. 7-17 depict examples of methods executed to perform the tasks.

Figure 7:
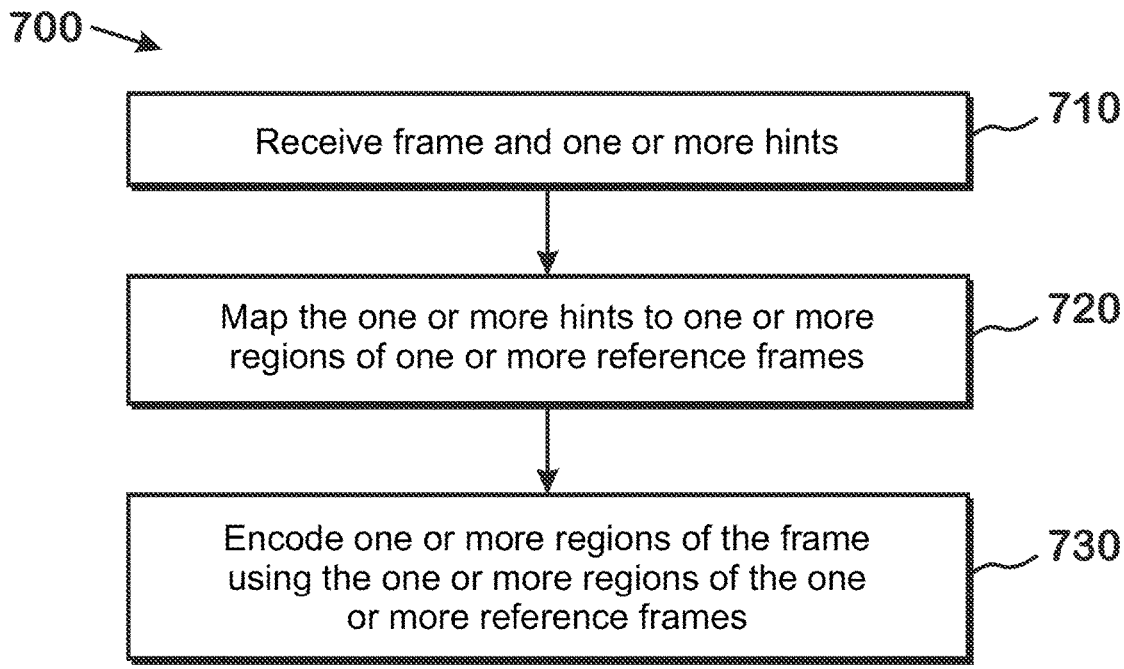
FIG. 7 is a diagram of an example method performed by a region-based reference frame management system.

FIG. 7 depicts an example method 700 performed by a region-based reference management system, such as the region-based reference management system 500 and 600 depicted in FIGS. 5 and 6, respectively. At 710, the region-based reference manager 520, such as that depicted in FIGS. 5 and 6, receives a frame and one or more hints. The frame and the one or more hints can be, for example, passed to the frame and hint pre-analysis block 521 depicted in FIG. 6.

Although not depicted, the one or more hints can be stored, for example, in storage 524 depicted in FIG. 6. At 720, the region-based reference manager 520 maps the one or more hints to one or more regions of one or more reference frames. In one example, an identifier associated with the frame is used as a hint and is provided along with a frame. One or more reference frames that are also associated with the identifier are used as reference frames for efficient prediction. At 730, region-based reference manager 520 passes the mapped one or more regions of the one or more reference frames and the frame to the encoder 540, where one or more regions of the frame are encoded using the mapped one or more regions of the one or more reference frames.

Figure 8:
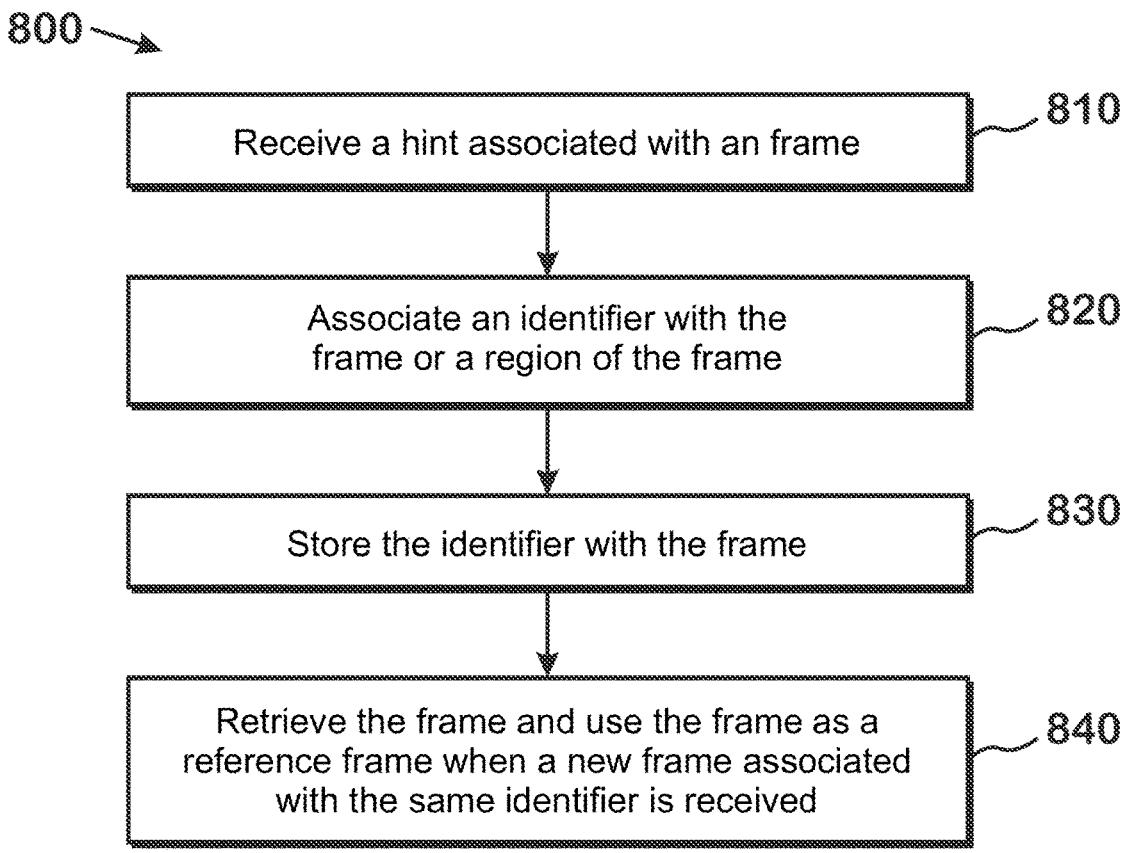
FIG. 8 is a diagram of another example method performed by a region-based reference frame management system.

FIG. 8 depicts another example method 800 performed by a region-based reference management system. At 810, the region-based reference manager 520 receives a hint associated with a frame. At 820, the region-based reference manager 520 associates an identifier with the frame or a region of the frame. In one example, the frame and hint pre-analysis block 521 depicted in FIG. 6 can perform the association. The frame and hint can be analyzed to determine one or more identifiers to associate with the frame. The one or more identifiers can be used to match the frame or one or more regions of the frame with a another frame or one or more regions of the another frame. At 830, the region-based reference manager 520 stores, for example in encoder stored reference frames 525*b* (DPB), the identifier with the frame. The identifier and the frame can also be stored in external storage 530 for offline analysis. At 840, the frame is retrieved from the encoder stored reference frames 525*b* (DPB) and is used as a reference frame when a new frame associated with the same identifier is received. In an example, the new frame and one or more associated hints can be analyzed to determine the same identifier. The determined same identifier can then be used to match the new frame or one or more regions of the new frame with a reference frame stored in the encoder stored reference frames 525*b*.

Figure 9:
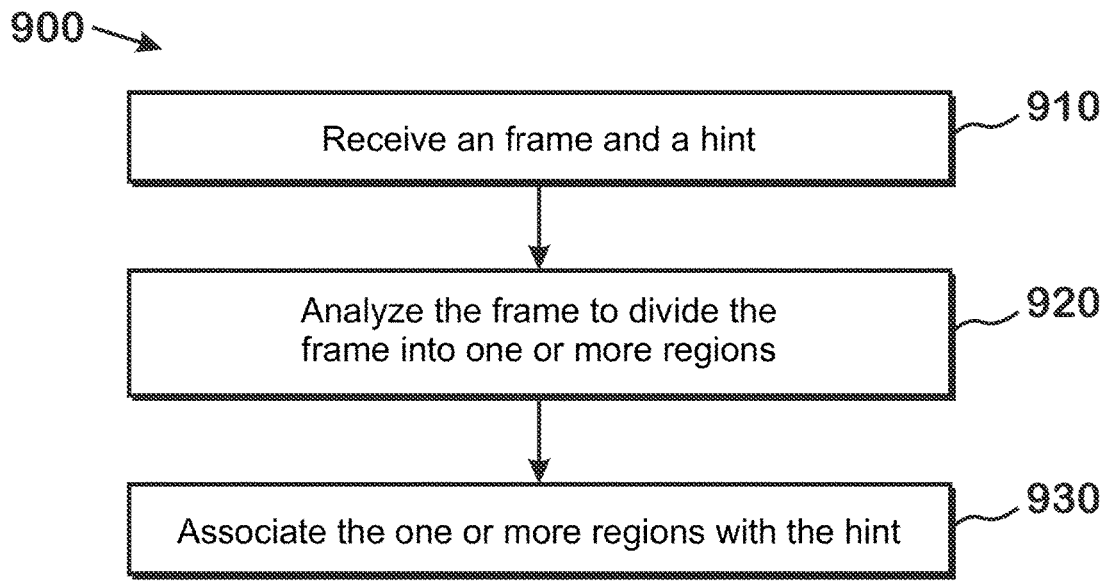
FIG. 9 is a diagram of another example method performed by a region-based reference frame management system.

FIG. 9 depicts another example method 900 performed by a region-based reference management system. At 910, the region-based reference manager 520 receives a frame and a hint. At 920, the region-based reference manager 520 analyzes the frame to divide the frame into one or more regions. For example, when an OS notification about a window is received, the region-based reference manager 520 recognizes that the frame will be divided into regions corresponding to the dimensions and location of the window. The frame can be analyzed by running edge/region detection filters on the frame to derive more accurate region information that enables improved reference frame prediction information. At 930, the region-based reference manager 520 associates the one or more regions with the received hint.

Figure 10:
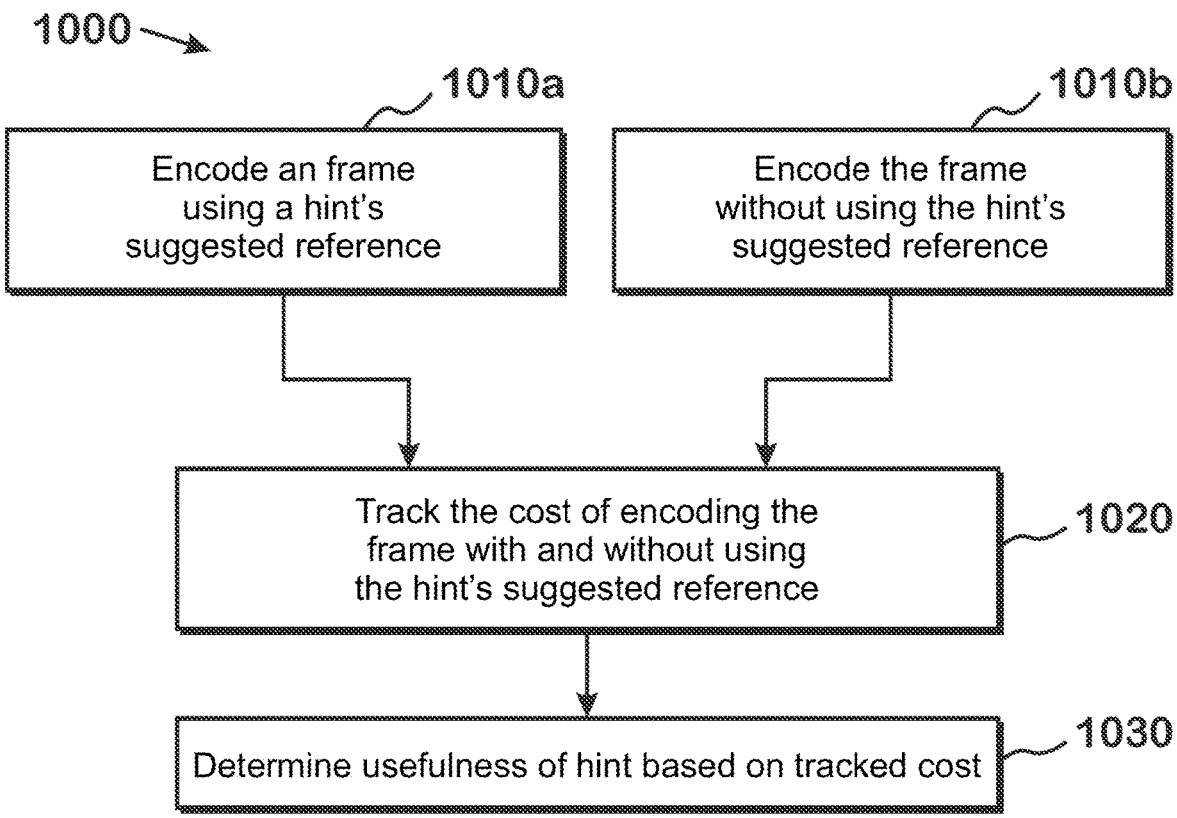
FIG. 10 is a diagram of another example method performed by a region-based reference frame management system.

FIG. 10 depicts another example method 1000 performed by a region-based reference management system. At 1010*a*, the encoder 540 encodes a frame using a hint's suggested reference. At 1010*b*, the encoder 540 encodes the frame without using the hint's suggested reference. At 1010*b*, the encoder 540 can encode the frame, for example, using another reference that was derived independently of the hint or can encode the frame using the immediately prior reference frame. Steps 1010*a* and 1010*b* can be executed concurrently or can be executed in any order. At 1020, the region-based reference manager 520 tracks the cost of encoding the frame with and without using the hint's suggested reference. At 1030, the region-based reference manager 520 determines the usefulness of the hint based on an analysis of the tracked cost. For example, if use of the hint's reference results in a history of a frequently high bit cost for encoding frames, the region-based reference manager 520 can use this information to adjust reference frame decisions to avoid use of that hint for deciding reference frame information for future frames.

Figure 11:
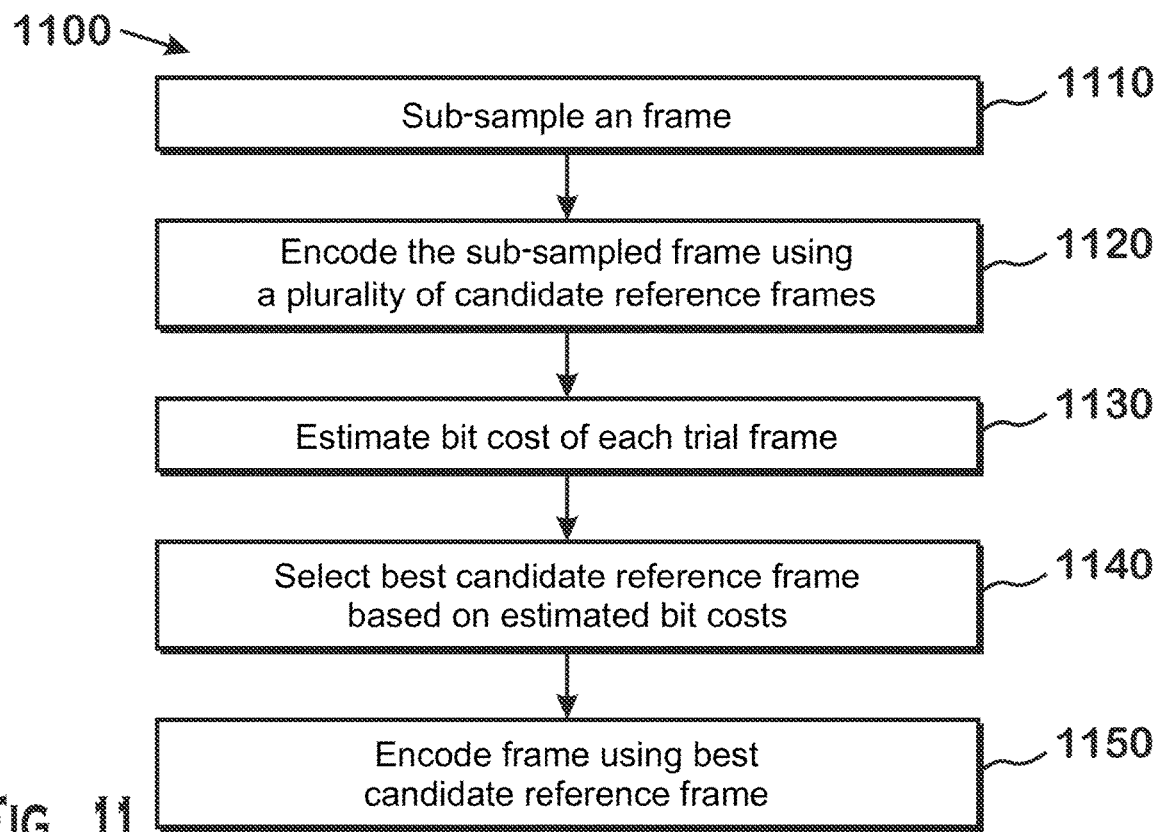
FIG. 11 is a diagram of another example method performed by a region-based reference frame management system.

FIG. 11 depicts another example method 1100 performed by a region-based reference management system. At 1110, the region-based reference manager 520 sub-samples a frame. At 1120, the region-based reference manager 520 or the encoder 540 encodes the sub-sampled frame using a plurality of candidate reference frames. For example, low-demanding computations can be quickly performed on the sub-sampled frame to generate a plurality of trial frames using the plurality of candidate reference frames. At 1130, the region-based reference manager 520 estimates a bit cost associated with each generated trial frame. At 1140, the region-based reference manager 520 selects the best candidate reference frame based on the estimated bit costs. At 1150, the encoder 540 encodes the frame using the selected best candidate reference frame.

Figure 12:
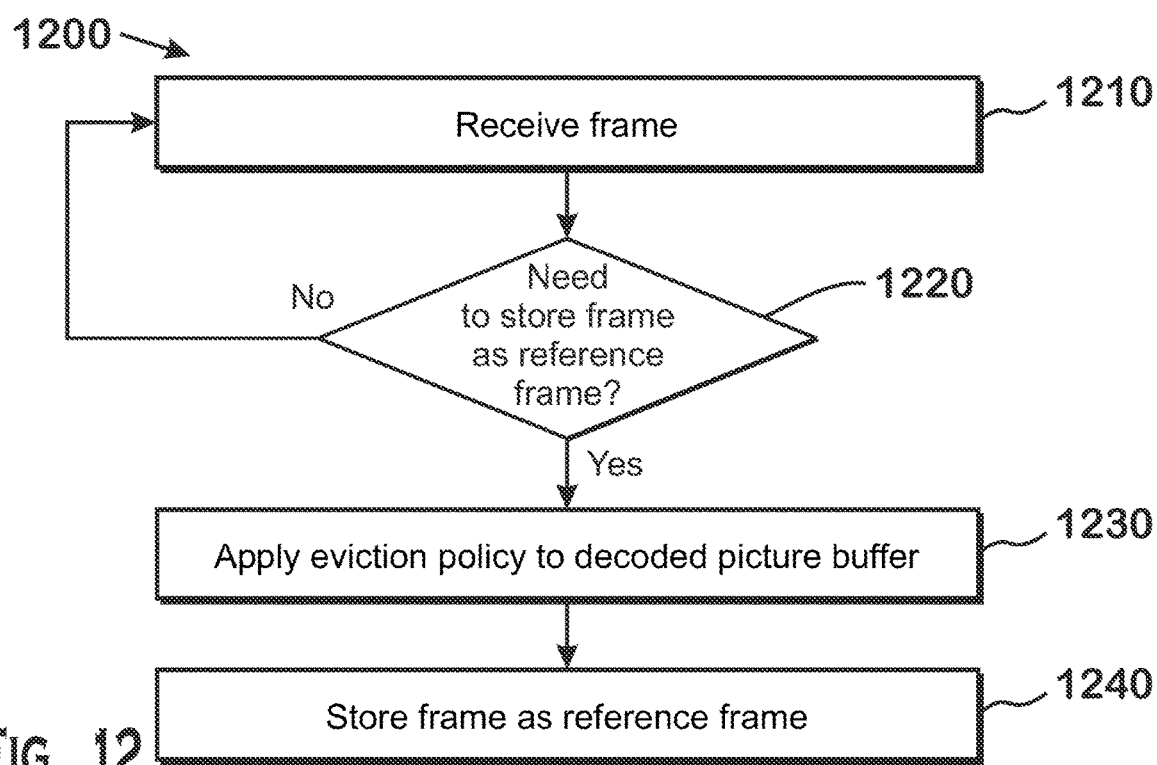
FIG. 12 is a diagram of another example method performed by a region-based reference frame management system.

FIG. 12 depicts another example method 1200 performed by a region-based reference management system. At 1210, the region-based reference manager 520 receives a frame. At 1220, the region-based reference manager 520 determines whether the frame needs to be stored as a reference frame. If the frame does not need to be stored, the method returns to 1210 for a new frame. If the frame needs to be stored as a reference frame, at 1230 an eviction policy is applied to the DPB. In general, a codec defines limits on a number of reference frames that can be stored in a DPB based on various factors such as resolution, profile, and level. As such, it requires intelligent decisions on which frames to evict from the DPB to maintain an optimal set of reference frames. In one example, an eviction policy can include evicting one of two reference frames if it is determined that the two reference frames are substantially similar. Such a policy can allow for storing a new reference frame with different content. The similarity of two reference frames can be determined based on hints associated with each reference frame, or can be determined based on analyses such as sum-of-absolute differences (SAD) or peak signal to noise ratio (PSNR) performed on regions of each of the two reference frames. Other eviction policies include evicting least recently used reference frames or least frequently used reference frames. The examples of eviction policies described herein are not limiting. Many eviction policies are possible that can consider any portion of the inputs received by the region-based reference manager 520, historical data for the particular original source content being encoded, etc. to make better eviction decisions. At 1240, the frame is stored as a reference frame.

Figure 13:
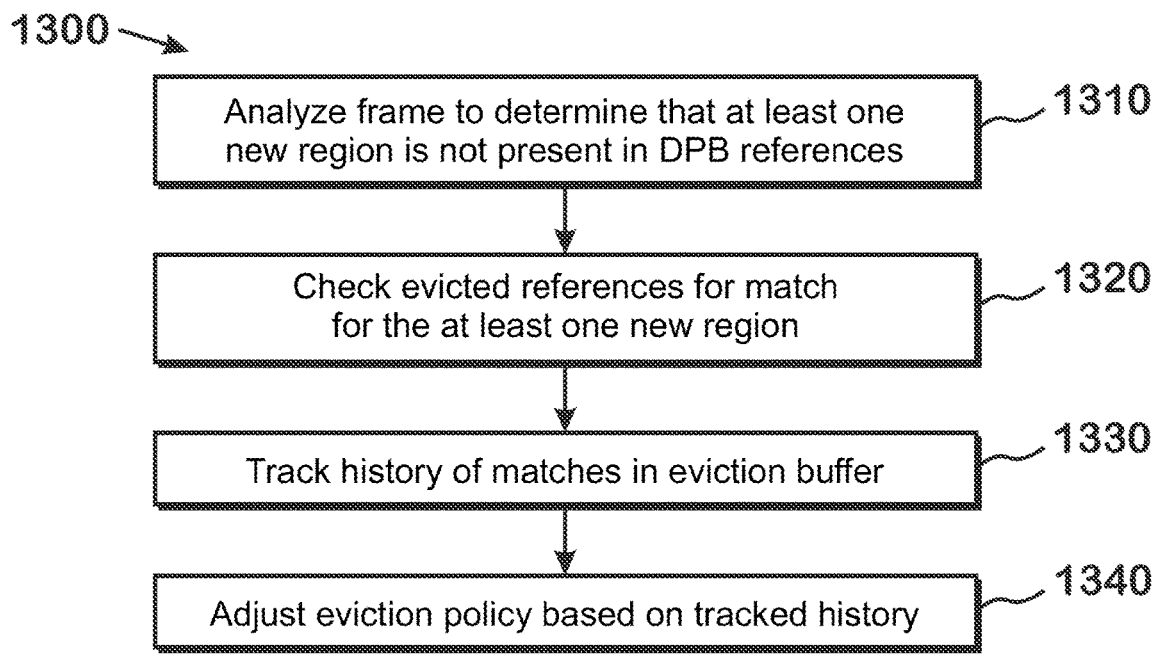
FIG. 13 is a diagram of another example method performed by a region-based reference frame management system.

FIG. 13 depicts another example method 1300 performed by a region-based reference management system. At 1310, the region-based reference manager 520 analyzes a frame and determines that at least one new region is not present in the references stored in the DPB. At 1320, the region-based reference manager 520 checks the evicted reference frame buffer 525*a* for a close match to the at least one new region. At 1330, the region-based reference manager 520 tracks a history of matches for the at least one new region in the eviction reference frame buffer 525*a*. At 1340, the region-based reference manager 520 adjusts the eviction policy based on the tracked history. In this way, the region-based reference manager 520 learns from its mistakes by using the tracked history to favor keeping reference frames in the DPB and not evicting these reference frames that have a history of matches to new frames. The evicted reference frame buffer 525a is not constrained by an encoder DPB size limitation. As such, the region-based reference manager 520 is capable of adjusting the size of the evicted reference frame buffer 525a, for example, based on resource constraints.

Figure 14:
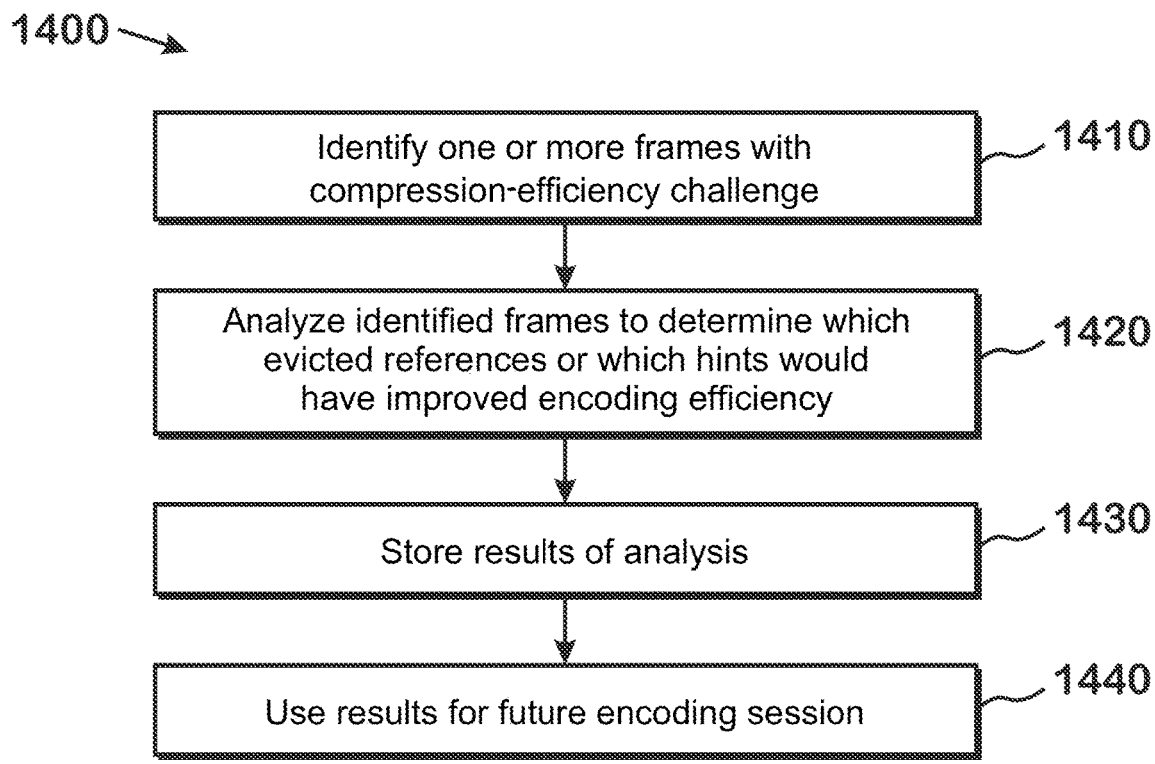
FIG. 14 is a diagram of another example method performed by a region-based reference frame management system.

FIG. 14 depicts another example method 1400 performed by a region-based reference management system. At 1410, the region-based reference manager 520 identifies one or more frames with a compression-efficiency challenge. A compression-efficiency challenge, for example, can be a frame that will be encoded using excessive bits due to a lack of highly correlated reference frame data. At 1420, the region-based reference manager 520 analyzes the identified frames to determine which evicted references or which hints would have improved encoding efficiency. At 1430, the region-based reference manager 520 stores results of the analysis. At 1440, the region-based reference manager 520 uses the stored results for a future encoding session. In one example, hints can be refined to avoid inaccurate estimates for future sessions. This is particularly useful for content that has a high correlation between sessions, such as game content or desktop recording content for a particular application.

Figure 15:
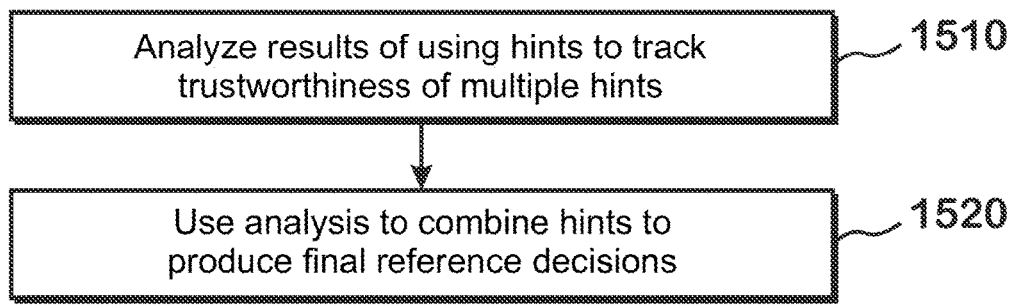
FIG. 15 is a diagram of another example method performed by a region-based reference frame management system.

FIG. 15 depicts another example method 1500 performed by a region-based reference management system. At 1510, the region-based reference manager 520 analyzes results of using particular hints to track a trustworthiness of multiple hints. For example, trustworthiness of a hint may be tracked by determining how often its use leads to high compression efficiency of a frame. Trustworthiness of additional hints can also be tracked and correlated with each other to determine if stronger reference frame decisions can be made in view of multiple hints. At 1520, the region-based reference manager 520 uses the analysis to combine hints to produce reference frame decisions that are more likely to be highly correlated to a frame in the future and thus result in higher compression efficiency.

Figure 16:
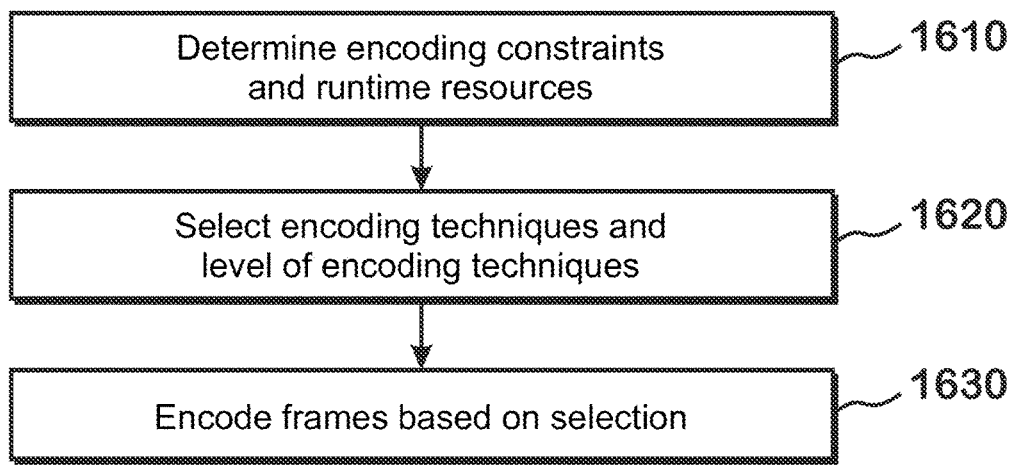
FIG. 16 is a diagram of another example method performed by a region-based reference frame management system.

FIG. 16 depicts another example method 1600 performed by a region-based reference management system. At 1610, the region-based reference manager 520 determines encoding constraints and runtime resources associated with an encoding session. At 1620, the region-based reference manager 520 selects which encoding techniques to employ and particular levels of complexity and computational intensity associated with the selected encoding techniques. At 1630, the encoder 540 encodes one or more frames based on the selections.

Figure 17:
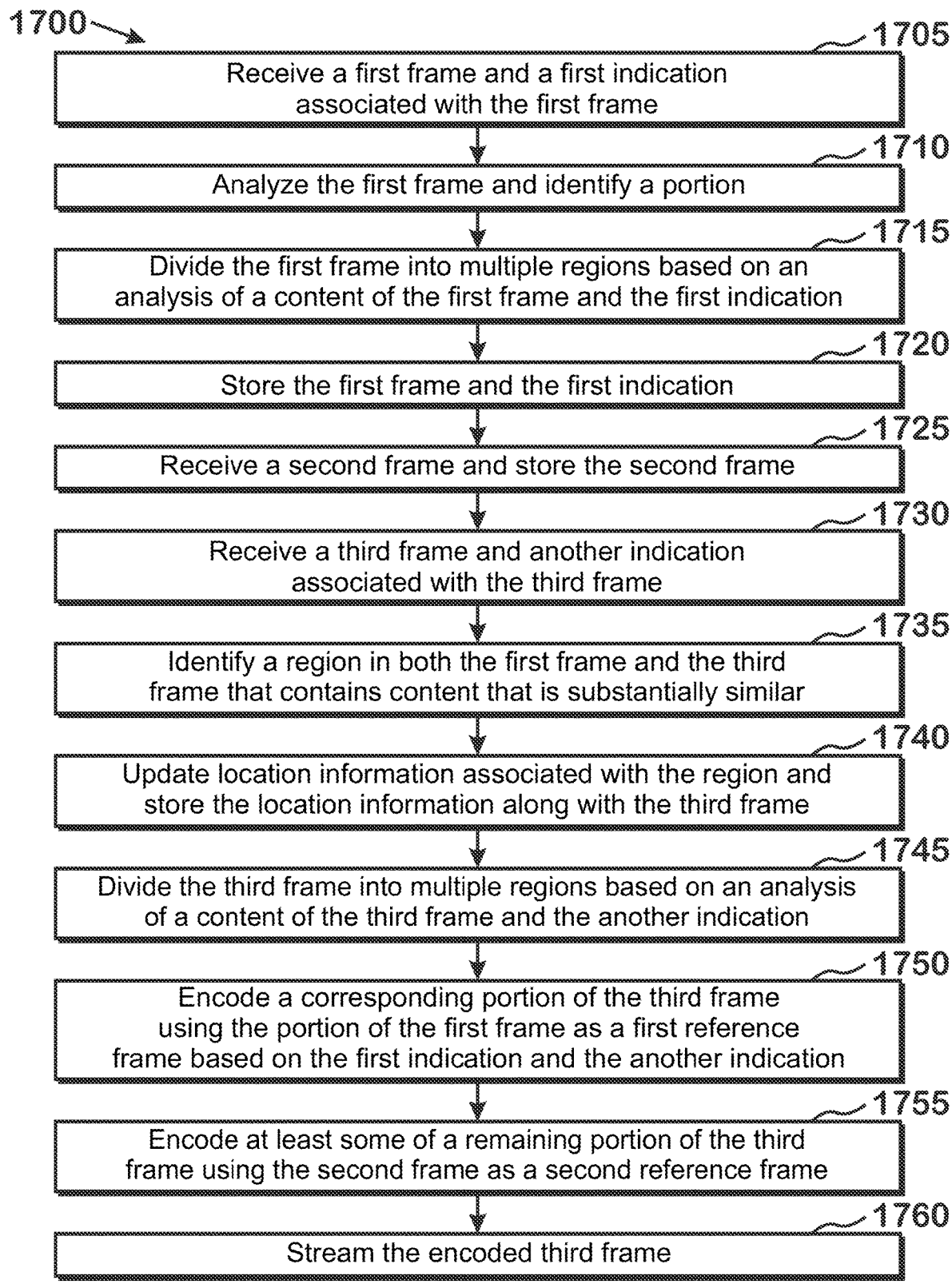
FIG. 17 is a diagram of another example method performed by a region-based reference frame management system.

FIG. 17 depicts another example method 1700 performed by a region-based reference management system. At 1705, the region-based reference manager 520 receives a first frame and a first indication associated with the first frame. The indication can be a hint provided by the OS, an application, a rendering SDK, an engine, etc. At 1710, the region-based reference manager 520 analyzes the first frame and identifies a portion of the first frame that can be associated with the first indication. At 1715, the region-based reference manager 520 divides the first frame into multiple regions based on an analysis of a content of the first frame and the first indication. At 1720, the region-based reference manager 520 stores the first frame and the first indication. At 1725, the region-based reference manager 520 receives a second frame and stores the second frame. At 1730, the region-based reference manager 520 receives a third frame and another indication that is associated with the third frame. At 1735, the region-based reference manager 520 identifies a region in both the first frame and the third frame that contains content that is substantially similar. The region-based reference manager 520 can identify a region in the first frame to use as reference for the third frame based on the first indication and the another indication matching. At 1740, the region-based reference manager 520 updates location information associated with the region and store the location information along with the third frame. At 1745, the region-based reference manager 520 divides the third frame into multiple regions based on an analysis of a content of the third frame and the another indication that is associated with the third frame. At 1750, the encoder 540 encodes a corresponding portion of the third frame using the portion of the first frame as first reference frame data based on the first indication and the another indication associated with the third reference frame. At 1755, the encoder 540 encodes at least some of a remaining portion of the third frame using the second frame as a second reference frame. At 1760, the region-based reference management system streams the encoded third frame.

It should be understood that many variations are possible based on the disclosure herein. Although features and elements are described above in particular combinations, each feature or element can be used alone without the other features and elements or in various combinations with or without other features and elements. For example, the methods depicted in FIGS. 7-17 are depicted including distinct steps and in a particular order. Any step can be combined with another step and any step can be separated into additional steps. Furthermore, there is no strict requirement for the steps to be performed in the particular order depicted unless a different order would be nonsensical to one of ordinary skill in the art. Lastly, the methods depicted in any one of FIGS. 7-17 as well as the included steps of each method are not meant to be strictly performed in entirety and separately from the methods and steps within any one of the other FIGS. 7-17. Therefore, one of ordinary skill in the art would readily recognize that steps from different methods depicted in the Figures can be interspersed and/or combined within steps of other depicted methods.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
receiving a first frame and a first indication associated with the first frame;
storing a reconstructed version of the first frame and the first indication;
receiving a second frame, wherein the second frame is received after the first frame;
storing a reconstructed version of the second frame;
receiving a third frame and another indication associated with the third frame, wherein the third frame is received after the second frame;
determining that the first indication matches the another indication; and
encoding the third frame, wherein the encoding includes:
encoding a portion of the third frame using the reconstructed version of the first frame based on the first indication and the another indication; and
encoding at least some of a remaining portion of the third frame using the reconstructed version of the second frame.

2. The method of claim 1, wherein the encoding further includes encoding the portion of the third frame using a corresponding portion of the reconstructed version of the first frame.

3. The method of claim 2 further comprising:
analyzing the third frame; and
identifying the corresponding portion of the reconstructed version of the first frame.

4. The method of claim 1, wherein the first indication identifies a window in the first frame and the another indication identifies the window in the third frame.

5. The method of claim 1, further comprising:
dividing the first frame into multiple regions; and
dividing the third frame into multiple regions.

6. The method of claim 5, wherein the dividing the first frame and the dividing the third frame is based on an analysis of a content of the first frame and the third frame.

7. The method of claim 1, further comprising:
encoding the first frame;
encoding the second frame; and
streaming the encoded first frame, the encoded second frame, and the encoded third frame.

8. The method of claim 1, further comprising:
tracking a cost of encoding the third frame using the first indication and the another indication; and
adjusting a choice of a future reference frame based on the tracking.

9. The method of claim 1, further comprising:
analyzing the reconstructed version of the first frame and the third frame based on the first indication and the another indication;
identifying a region in both the reconstructed version of the first frame and the third frame that contains same content; and
updating location information associated with the region and storing the location information along with a reconstructed version of the third frame.

10. A non-transitory computer readable storage medium included in an apparatus, the non-transitory computer readable storage medium comprising executable instructions that when executed by at least one processor, cause the apparatus to:
receive a first frame and a first indication associated with the first frame;
store a reconstructed version of the first frame and the first indication;
receive a second frame, wherein the second frame is received after the first frame;
store a reconstructed version of the second frame;
receive a third frame and another indication associated with the third frame, wherein the third frame is received after the second frame;
determine that the first indication matches the another indication; and
encode the third frame, wherein:
a portion of the third frame is encoded using the reconstructed version of the first frame based on the first indication and the another indication; and
at least some of a remaining portion of the third frame is encoded using the reconstructed version of the second frame.

11. The non-transitory computer readable storage medium of claim 10, wherein the executable instructions, when executed by the at least one processor, further cause the apparatus to:
encode the portion of the third frame using a corresponding portion of the reconstructed version of the first frame.

12. The non-transitory computer readable storage medium of claim 11, wherein the executable instructions, when executed by the at least one processor, further cause apparatus to:
analyze the third frame; and
identify the corresponding portion of the reconstructed version of the first frame.

13. The non-transitory computer readable storage medium of claim 10, wherein the first indication identifies a window in the first frame and the another indication identifies the window in the third frame.

14. The non-transitory computer readable storage medium of claim 10, wherein the executable instructions, when executed by the at least one processor, further cause the apparatus to:
divide the first frame into multiple regions; and
divide the third frame into multiple regions.

15. The non-transitory computer readable storage medium of claim 14, wherein the first frame and the third frame are divided based on an analysis of a content of the first frame and the third frame.

16. The non-transitory computer readable storage medium of claim 10, wherein the executable instructions, when executed by the at least one processor, further cause the apparatus to:
encode the first frame;
encode the second frame; and
stream the encoded first frame, the encoded second frame, and the encoded third frame.

17. The non-transitory computer readable storage medium of claim 10, wherein the executable instructions, when executed by the at least one processor, further cause the apparatus to:
track a cost of encoding the third frame using the first indication and the another indication; and
adjust a choice of a future reference frame based on the tracking.

18. The non-transitory computer readable storage medium of claim 10, wherein the executable instructions, when executed by the at least one processor, further cause the apparatus to:
- analyze the first frame and the third frame based on the first indication and the another indication;
- identify a region in both the first frame and the third frame that contains same content; and
- update location information associated with the region and storing the location information along with the third frame.

19. A computing system comprising:
- a memory storing operational instructions thereon; and
- a processor operationally coupled to the memory, wherein the processor, when executing the operational instructions, is configured to:
- receive a first frame and a first indication associated with the first frame;
- store a reconstructed version of the first frame and the first indication;
- receive a second frame, wherein the second frame is received after the first frame;
- store a reconstructed version of the second frame;
- receive a third frame and another indication associated with the third frame, wherein the third frame is received after the second frame;
- determine that the first indication matches the another indication;
- encode the third frame, wherein:
  - a portion of the third frame is encoded using the reconstructed version of the first frame based on the first indication and the another indication; and
  - at least some of a remaining portion of the third frame is encoded using the reconstructed version of the second frame;
- track a cost of encoding the third frame using the first indication and the another indication; and
- adjust a choice of a future reference frame based on the tracking.

20. The computer system of claim 19, wherein the processor is further configured to:
- determine that the first indication matches the another indication.

21. The non-transitory computer readable storage medium of claim 10, wherein the executable instructions, when executed by the at least one processor, further cause the apparatus to:
- track a cost of encoding the third frame using the first indication and the another indication; and
- adjust a choice of a future reference frame based on the tracking.

* * * * *